(12) United States Patent
Hakiri et al.

(10) Patent No.: US 8,955,953 B2
(45) Date of Patent: Feb. 17, 2015

(54) INKJET RECORDING INK, INK CARTRIDGE, INKJET PRINTING APPARATUS AND IMAGE FORMING METHOD

(75) Inventors: Minoru Hakiri, Shizuoka (JP); Mitsuru Naruse, Shizuoka (JP); Shin Hasegawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 909 days.

(21) Appl. No.: 12/864,570

(22) PCT Filed: Jan. 22, 2009

(86) PCT No.: PCT/JP2009/051390
§ 371 (c)(1),
(2), (4) Date: Jul. 26, 2010

(87) PCT Pub. No.: WO2009/093751
PCT Pub. Date: Jul. 30, 2009

(65) Prior Publication Data
US 2010/0309260 A1    Dec. 9, 2010

(30) Foreign Application Priority Data

Jan. 25, 2008  (JP) ................................ 2008-015177

(51) Int. Cl.
*B41J 2/01* (2006.01)
*C09D 11/324* (2014.01)

(52) U.S. Cl.
CPC .................................... *C09D 11/324* (2013.01)
USPC ................. 347/100; 347/56; 347/68

(58) Field of Classification Search
USPC ...................... 347/56, 68, 100; 524/496, 591; 427/256; 977/775, 902
See application file for complete search history.

(56) References Cited

U.S. PATENT DOCUMENTS

| | | | |
|---|---|---|---|
| 5,085,698 A | 2/1992 | Ma et al. | |
| 5,172,133 A | 12/1992 | Suga et al. | |
| 5,221,334 A | 6/1993 | Ma et al. | |
| 5,571,311 A | 11/1996 | Belmont et al. | |
| 6,786,959 B2 | 9/2004 | Hakiri et al. | |
| 7,101,919 B2 | 9/2006 | Hasegawa et al. | |
| 2004/0138337 A1* | 7/2004 | Hasegawa et al. | 347/100 |
| 2006/0209149 A1* | 9/2006 | Hasegawa et al. | 347/100 |
| 2006/0235108 A1 | 10/2006 | Koganehira | |
| 2006/0272543 A1 | 12/2006 | Hakiri et al. | |
| 2008/0036830 A1* | 2/2008 | Natori et al. | 347/100 |
| 2008/0036840 A1* | 2/2008 | Hakiri et al. | 347/100 |

FOREIGN PATENT DOCUMENTS

| | | |
|---|---|---|
| EP | 1 416 020 A1 | 5/2004 |
| JP | 56 147871 | 11/1981 |
| JP | 5 239392 | 9/1993 |
| JP | 8 3498 | 1/1996 |
| JP | 8 81646 | 3/1996 |
| JP | 8 283633 | 10/1996 |
| JP | 8 333531 | 12/1996 |
| JP | 9 31360 | 2/1997 |
| JP | 9 194775 | 7/1997 |
| JP | 2867491 | 12/1998 |
| JP | 2000 1639 | 1/2000 |
| JP | 2000 63727 | 2/2000 |
| JP | 2000 144028 | 5/2000 |
| JP | 2001 81366 | 3/2001 |
| JP | 2002 167536 | 6/2002 |
| JP | 2004 169008 | 6/2004 |
| JP | 2004-269880 A | 9/2004 |
| JP | 2005 290044 | 10/2005 |
| JP | 2006 70123 | 3/2006 |
| JP | 2006 282760 | 10/2006 |
| JP | 2006-335858 A | 12/2006 |
| JP | 2007 9184 | 1/2007 |
| JP | 2007 191556 | 8/2007 |
| JP | 2007 211058 | 8/2007 |
| JP | 2007 231191 | 9/2007 |
| WO | 2004 092285 | 10/2004 |
| WO | WO 2007/100121 A1 | 9/2007 |
| WO | WO 2009/145284 A1 | 12/2009 |

OTHER PUBLICATIONS

International Search Report issued Apr. 28, 2009 in PCT/JP09/051390 filed Jan. 22, 2009.
Extended European Search Report issued Sep. 12, 2013 in Patent Application No. 09 70 3406.0.

* cited by examiner

*Primary Examiner* — Daniel Petkovsek
(74) *Attorney, Agent, or Firm* — Oblon, Spivak, McClelland, Maier & Neustadt, L.L.P.

(57) ABSTRACT

An inkjet recording ink including a carbon black, a dispersant, a polyurethane resin particle, and water, where the carbon black is a channel black, a gas black, or a mixture of channel black and a gas black, and the polyurethane resin particle is an anionic self-emulsifying ether-based polyurethane resin particle, wherein the anionic self-emulsifying ether-based polyurethane resin particle has an acid value of 40 to 120 and a mass average molecular weight of 500 to 50,000, and an average primary particle diameter of 20 nm or less.

13 Claims, No Drawings

INKJET RECORDING INK, INK CARTRIDGE, INKJET PRINTING APPARATUS AND IMAGE FORMING METHOD

TECHNICAL FIELD

The present invention relates to an inkjet recording ink, specifically to an inkjet recording ink excellent in ejection stability and storage stability of ink liquid. More specifically, the present invention relates to a black ink for an inkjet printing, which is improved so as to prevent the occurrence of inkjet head clogging, provides high density image, and is excellent in abrasion resistance.

BACKGROUND ART

Inkjet recording is advantageous in that it facilitates full-color printing because the process is easier and simpler than any other recording methods and it can provide high resolution images. As an inkjet ink, a dye-based ink is typically used in which various water-soluble dyes are dissolved in water or a mixed liquid containing water and an organic solvent. However, dye-based inks have a disadvantage in that they are poor in light resistance, although they are excellent in color tone definition. In the meanwhile, pigment-based inks in which carbon black or various organic pigments are dispersed are now actively studied because of their excellence in light resistance, as compared to dye-based inks.

However, pigment-based inks tend to cause nozzle clogging as compared to dye-based inks. Pigment-based inks are generally prepared by first preparing a dispersion liquid in which a coloring material and a dispersant are preliminary dispersed in an aqueous solvent such as water and alcohols, next dispersing the dispersion liquid to a certain degree using a medium-type dispersing device such as sand mill, and then diluting the dispersion to a specific concentration.

Typically, in a water-based pigment ink, a hydrophobic pigment is dispersed, and thus it is usual to use a dispersant such as surfactant and water-soluble resin. However, there is a problem that reliability of quality of obtained images with the use of such a pigment water-based ink is extremely poor. Then, in order to improve image quality, a technique is disclosed in which film-formable resin fine particles are added into an ink liquid. However, it is difficult to finely and stably disperse a plurality of components in a liquid for a long period of time. When a large amount of a dispersant such as surfactant is used to stably disperse fine particles, there are problems with occurrence of air bubbles in an ink tank or an ink head, degradation in image quality and the like. To improve dispersibility of these components, there have been a method of changing the surface of a pigment to a surface containing a hydrophilic group and a method of using a resin containing a hydrophilic group, and the like. However, employment of such a method causes a problem that when different type components are mixed, the components are unstably dispersed and the storage stability of the ink is degraded, although when one of these components is singularly used, it can be stably dispersed in a water-based ink liquid.

Patent Literature 1 discloses an ink that contains, together with a pigment, a polyether polyurethane resin having acid groups, for the purpose of improving glossiness of images and stability of the initial dispersion. Patent Literature 2 discloses an ink using, as a polyurethane resin, polycaprolactone polyurethane resin derived from polycaprolactondiol. Patent Literature 3 discloses an ink using polyether polyurethane resin derived from polyetherdiol. Patent Literature 4 discloses an ink using polyester polyurethane resin derived from an aliphatic polyesterdiol.

In addition, the following methods are also reported: a method in which a water-dispersible resin having a carboxyl group and a nonionic hydrophilic group in a molecule is dispersed in water (see Patent Literature 5); a method in which the polarity of a water-soluble polymer is identical to that of a surfactant or a nonionic surfactant is added in a water-based liquid (see Patent Literature 6); a method in which in an aqueous recording liquid, the polarity of a color ionic group-containing polyester resin is identical to that of hydrophilic groups of colorants (see Patent Literature 7); and a method in which the polarity of pigments is identical to that of a resin fine particle (see Patent Literature 8).

In addition, an aqueous inkjet ink composition is proposed which contains (i) a pigment dispersion liquid containing pigment particles having a specific particle size distribution in which at least 70% of the particles in the dispersion liquid have a diameter less than 0.1 μm and other particles in the dispersion liquid have a diameter of 0.1 μm or less, (ii) an aldehyde naphthalenesulfonate dispersant, and/or (iii) at least one type of sulfonic solvent (Patent Literature 9).

Also, Patent Literature 10 proposes a recording liquid which contains a pigment, a polymer dispersant and a non-ionic surfactant. Patent Literature 11 and 12 propose using an AB block copolymer or a BAB block copolymer as a dispersant for pigments to be used. Further, Patent Literature 13 proposes using a specific pigment, a water-soluble resin and a solvent.

Although the incorporation of a resin emulsion into a water-based pigment ink to improve ink fixability has already been proposed, Patent Literature 14, for example, discloses an ink containing a wax emulsion, a resin emulsion, a latex, and an inorganic or organic super fine particle and having the minimum film forming temperature of 40° C. or higher. This document also discloses that examples of practicable resin emulsion include, solely or as a copolymer, an emulsion of vinyl acetate, acryl, styrene, olefin, and the like, the emulsion having the minimum film forming temperature of 40° C. or higher. In other words, there is no specific limitation to the resin composition, provided that only the condition of the minimum film forming temperature is met. This document is silent on advantages or disadvantages in the effects depending on the types of the resins, and the inks used in the examples show the same excellent performances and effects, irrespective of the resin types. However, since the resin emulsions shown in the examples use pigments having a large particle diameter of 1.0 μm or less, the resin emulsion does not fulfill the requirements of abrasion resistance, ink storage stability, and image density when a particle diameter of the pigment is 70 nm to 180 nm.

The present inventors have previously reported in Patent Literature 15 that by selection of a specific polyurethane resin (i.e., an anionic self-emulsifying polyurethane resin similar to the polyurethane resin used in the present invention), the requirements of image fixability, ink storage stability, and ejection stability are satisfied even when the particle diameter of the color pigment is in the range of 70 nm to 180 nm, and also recognized that furnace black and channel black are equally usable as a black pigment ([0028]). However, the present inventors' extensive studies performed thereafter reveal that in some cases a polyurethane resin can be aggregated by an organic solvent contained in the inkjet recording ink, resulting in impairment of image fixability, ink storage stability, and ejection stability. Accordingly, a resin emulsion satisfying all of the above performances simultaneously still remains to be discovered.

In the meantime, methods of dispersing a pigment without using a dispersant have been disclosed. Examples thereof include a method in which a substituent having a water-solubilizing group is introduced to a carbon black (Patent Literature 16); a method in which a water-soluble or the like is polymerized onto the surface or a carbon black (Patent Literature 17); a method in which a carbon black is oxidized (Patent Literature 18); and a method in which an oxidized carbon black and a ternary polymer having acrylic acid, styrene, and α-methylstyrene are incorporated into an ink to ensure water resistance and ejection stability (Patent Literature 19).

Additionally, an inkjet recording liquid is proposed which is characterized in that dispersed particles have a volume average particle diameter of 30 nm to 200 nm (Patent Literature 20).

However, none of the above-described conventional ink liquids can provide a sufficient, satisfiable image density with respect to black pigment ink, although they can exhibit high image density with respect to color pigment ink.

Patent Literature 1: Japanese Patent Application Laid-Open (JP-A) No. 2005-290044
Patent Literature 2: Japanese Patent Application Laid-Open (JP-A) No. 09-031360
Patent Literature 3: Japanese Patent Application Laid-Open (JP-A) No. 2000-001639
Patent Literature 4: Japanese Patent Application Laid-Open (JP-A) No. 2002-167536
Patent Literature 5: Japanese Patent Application Laid-Open (JP-A) No. 05-239392
Patent Literature 6: Japanese Patent Application Laid-Open (JP-A) No. 08-283633
Patent Literature 7: Japanese Patent Application Laid-Open (JP-A) No. 2000-063727
Patent Literature 8: Japanese Patent Application Laid-Open (JP-A) No. 2001-081366
Patent Literature 9: Japanese Patent Application Laid-Open (JP-A) No. 08-333531
Patent Literature 10: Japanese Patent Application Laid-Open (JP-A) No. 56-147871
Patent Literature 11: U.S. Pat. No. 5,085,698
Patent Literature 12: U.S. Pat. No. 5,221,334
Patent Literature 13: U.S. Pat. No. 5,172,133
Patent Literature 14: Japanese Patent (JP-B) No. 2,867,491
Patent Literature 15: Japanese Patent Application Laid-Open (JP-A) No. 2004-169008
Patent Literature 16: U.S. Pat. No. 5,571,311
Patent Literature 17: Japanese Patent Application Laid-Open (JP-A) No. 08-081646
Patent Literature 18: Japanese Patent Application Laid-Open (JP-A) No. 08-003498
Patent Literature 19: Japanese Patent Application Laid-Open (JP-A) No. 09-194775
Patent Literature 20: Japanese Patent Application Laid-Open (JP-A) No. 2000-144028

DISCLOSURE OF THE INVENTION

The present invention has been accomplished in light of the above-mentioned situation. An object of the present invention is to provide a black ink for inkjet recording which exhibits a high image density and is excellent in ejection stability, storage stability of ink liquid, and abrasion resistance, and to provide an ink cartridge therefor, inkjet recording apparatus therefor, an image forming process, and an image-formed material.

The inventors of the present invention have performed extensive studies and have found that the above-noted problems can be solved by specifying a range of a primary particle diameter and a range of BET specific surface area when producing a carbon black; by specifying a range of naphthalenesulfonate condensation degree of a naphthalenesulfonate formalin condensate to be used as a dispersant; and by using an inkjet recording ink containing an anionic self-emulsifying ether-based polyurethane resin emulsion. The present invention has been accomplished on the basis of these findings by the present inventors.

Specifically, the object of the present invention is achieved by the following <1> to <17>:

<1> An inkjet recording ink including at least:
a carbon black,
a dispersant,
a polyurethane resin particle, and
water,
wherein the carbon black is a channel black, a gas black, or a mixture of a channel black and a gas black, and the polyurethane resin particle is an anionic self-emulsifying ether-based polyurethane resin particle, wherein the anionic self-emulsifying ether-based polyurethane resin particle has an acid value of 40 to 120 and a mass-average molecular weight of 500 to 50,000, and an average primary particle diameter of 20 nm or less.

<2> The inkjet recording ink according to <1>, wherein the dispersant contains a sodium naphthalenesulfonate formalin condensate in which dimer, trimer and tetramer naphthalenesulfonates are contained in a total amount of 20% by mass to 80% by mass.

<3> The inkjet recording ink according to any one of <1> and <2>, wherein the carbon black has a BET specific surface area of 100 $m^2/g$ to 400 $m^2/g$, and average primary particle diameter of 10 nm to 30 nm.

<4> The inkjet recording ink according to any one of <1> to <3>, wherein an average particle diameter (D50) of the carbon black measured by dynamic light scattering method is 70 nm to 180 nm, and a standard deviation in particle size distribution of the carbon black is equal to or lower than one-half of the average particle diameter.

<5> The inkjet recording ink according to any one of <1> to <4>, wherein a mixing ratio of the dispersant to the carbon black is 0.1 to 2 on a mass basis.

<6> The inkjet recording ink according to any one of <1> to <5>, wherein the amount of the carbon black is 5% by mass to 50% by mass.

<7> The inkjet recording ink according to any one of <1> to <6>, wherein an emulsion of the ether-based polyurethane resin has a glass transition temperature of −50° C. to 150° C.

<8> The inkjet recording ink according to any one of <1> to <7>, wherein the minimum film forming temperature of an emulsion of the ether polyurethane resin is 25° C. or lower.

<9> The inkjet recording ink according to any one of <1> to <8>, wherein the amount of an emulsion of the ether-based polyurethane resin is 0.1% by mass to 20% by mass.

<10> The inkjet recording ink according to any one of <1> to <9>, wherein the amount of the carbon black is 1% by mass to 20% by mass.

<11> An ink cartridge including:
the inkjet recording ink according to any one of <1> to <10>, and
a container main body in which the inkjet recording ink is housed.

<12> An inkjet printing apparatus having an ink ejection unit configured to eject the inkjet recording ink according to any one of <1> to <10> onto an image support.

<13> The inkjet printing apparatus according to <12>, wherein the ink ejection unit is of a piezo type.

<14> The inkjet printing apparatus according to <12>, wherein the ink ejection unit is of a thermal type.

<15> An image forming method including:
printing an image through an inkjet recording process using the inkjet recording ink according to any one of <1> to <10>.

<16> An image-formed matter including:
an image support, and
an image printed on the image support through an inkjet recording process using the inkjet recording ink according to any one of <1> to <10>.

<17> The image-formed matter according to claim 16, wherein the image support is paper.

As will be clear from the detailed, specific description below, the inkjet recording ink of the present invention exhibits high image density and is more excellent in ejection stability, ink storage stability, and abrasion resistance than any conventional inks.

BEST MODE FOR CARRYING OUT THE INVENTION

Next, the present invention will be described in detail and specifically.

As mentioned above, the inkjet recording ink of the present invention includes at least a carbon black, a dispersant, a polyurethane resin particle, and water, wherein the carbon black is a channel black, a gas black, or a mixture thereof, and the polyurethane resin particle is an anionic self-emulsifying ether-based polyurethane resin particle, the anionic self-emulsifying ether-based polyurethane resin having an acid value of 40 to 120 and a mass-average molecular weight of 500 to 50,000, and an average primary particle diameter of 20 nm or less.

Channel black is a carbon black precipitated when contacting the flame caused by the imperfect combustion of aromatic oil, as a raw material, with a channel steel (H type steel), while gas black is a carbon black precipitated by the imperfect combustion of natural gas as a main raw material.

The carbon black used in the present invention is produced by a gas black method. The carbon black preferably has an average primary particle diameter of 10.0 nm to 30.0 nm, and a BET specific surface area of 100 m$^2$/g to 400 m$^2$/g. More preferably, the average primary particle diameter of the carbon black is 15.0 nm to 20.0 nm, and the BET specific surface area is 150 m$^2$/g to 300 m$^2$/g.

In the inkjet recording ink of the present invention, a mixing ratio of the dispersing agent to the carbon black is preferably 0.1:1 to 2:1 on a mass basis. More preferably, the mixing ratio of the dispersant to the carbon black is 0.25:1 to 1:1 with respect to 1 of carbon black. The use of the dispersant and the carbon black at a ratio 0.1:1 to 2:1 enables to obtain a dispersion liquid of the present invention (hereinafter may be called a pigment dispersion liquid) in which the average particle diameter (D50) of the carbon black is 70 nm to 180 nm, and the standard deviation of particle diameters in the carbon black particle diameter distribution is lower than one half of the average particle diameter, thereby making it possible to provide a pigment dispersion liquid having a high image density, high ejection stability, and high liquid stability. When the ratio of the amount of the dispersant is less than 0.1, the above-mentioned effects are hardly obtained, and the storage stability of the pigment dispersion liquid and the ink is degraded, which tends to cause the nozzle clogging. When the ratio of the to amount of the dispersant is more than 2, it tends to be difficult to print images by an inkjet process due to the excessively high viscosity of the pigment dispersion liquid and the ink.

As the dispersant in the present invention, it is preferred to use a sodium naphthalenesulfonate formalin condensate having the General Formula as shown below. However, when the total amount of a dimer, a trimer and a tetramer naphthalenesulfonate in the sodium naphthalenesulfonate formalin condensate is less than 20% by mass, the dispersibility is degraded and the storage stability of the pigment dispersion liquid and the ink is poor, and nozzle clogging easily occur.

In contrast, when the total amount of a dimer, a trimer and a tetramer naphthalenesulfonates in the sodium naphthalenesulfonate formalin condensate is more than 80% by mass, the viscosity of the pigment dispersion liquid is so high that it is difficult to disperse the pigment.

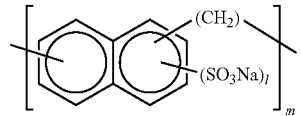

In the General Formula, l is an integer of 1 to 3, and m is an integer of 1 to 200, preferably 1 to 4.

In the inkjet recording ink of the present invention, the pigment concentration is preferably 5% by mass to 50% by mass to the total mass of the dispersion liquid. When the pigment concentration is less than 5% by mass, the productivity of the ink is inferior. In contrast, when the pigment concentration is more than 50% by mass, the viscosity of the pigment dispersion liquid is so high that it is difficult to disperse the pigment.

Polyurethane resin emulsion falls into two types: an emulsion made by emulsifying a relatively hydrophilic ordinary polyurethane resin using an emulsifying agent; and a self-emulsifying type emulsion in which a functional group, serving as an emulsifying agent, has been introduced by means of copolymerization or the like. The anionic self-emulsifying polyurethane resin emulsion in the present invention belongs to the latter. In terms of adherence property of the pigment and various combinations of the pigment and a dispersant, as an anionic polyurethane resin always excellent in dispersion stability, preferred is an ether type rather than a polyester type or a polycarbonate type. Many of non-ether type resins are poor in solvent resistance, and the viscosity tends to increase during high temperature storage of the ink, although the reason therefor is unknown.

Of the ether polyurethane emulsion, preferred are those having an acid value of 40 to 120, a mass-average molecular weight of 500 to 50,000, and an average primary particle diameter of 20 nm or less, more preferably 15 nm or less, even more preferably 10 nm or less.

A gas black type carbon black used in the present invention is well matched with an ether polyurethane resin emulsion having a small average particle diameter, resulting in good dispersion stability.

In particular, when an average particle diameter is 10 nm or less, such a trouble can be more effectively avoided that the ejection of an ink stops during continuation of printing.

When an ink cannot be ejected, cleaning of the ink flow path, including a nozzle hole, of the inkjet printing apparatus may allow the printing apparatus to work again, but such cleaning is practically disadvantageous. The average particle diameter of the ether polyurethane resin emulsion in the present invention is a value measured using the MICROTRAC UPA produced by Nikkiso Co., Ltd. under the condition of 23° C. and 55% RH.

The glass transition temperature of the ether polyurethane resin emulsion is preferably in the range of −50° C. to 150° C., more preferably, −10° C. to 100° C. When the glass transition temperature is 150° C. or lower, the film of the ether polyurethane resin is glassy and rigid, and pigments particles and the ether polyurethane resin concurrently impacts onto the image support, and the abrasion resistance of the printed portions is weaker than expected, although the reason therefor is unknown. In the meanwhile, when the glass transition temperature is lower than 150° C., the ether polyurethane resin is in the form of polyurethane rubber and is soft, but is excellent in abrasion resistance. However, when the glass transition temperature is lower than −50° C., the film made of the ether polyurethane resin is too soft and is poor in abrasion resistance. Thus it is clear that, if the same amount is used, the ether polyurethane resin having a glass transition temperature falling within −50° C. to 150° C. has greater anti-scratch effect. The glass transition temperature of the resin is measured by either the different scanning calorimetry (DSC) or the thermo mechanical analysis (TMA).

The ether polyurethane resin emulsion preferably has a minimum film-forming temperature (MFT) lower than room temperature, more preferably, 25° C. or lower. If the film of the ether polyurethane resin emulsion is formed at a temperature lower than room temperature, preferably at 25° C. or lower temperature, the paper fibers automatically bind without heating or drying the support after an image is formed thereon.

The term "minimum film-forming temperature (MFT)" is defined as a minimum temperature at which a transparent continuous film is formed when aqueous emulsion particles obtained by dispersing ether polyurethane resin emulsion particles in water is thinly poured and extended over a metallic plate such as aluminum plate and the temperature is elevated. At a temperature lower than the minimum film-forming temperature, the ether polyurethane resin emulsion comes to a state of white powder.

The term "film-forming" means that a resin film is formed when resin fine particles are dispersed in water to form a resin emulsion, followed by evaporating water contained in a continuous layer of the resin emulsion. This resin film has a function of making a pigment in the ink adhere strongly to the surface of the image support. Thanks to this function, an image excellent in abrasion resistance and in water resistance can be formed.

The ether polyurethane resin emulsion in the pigment dispersion liquid in the present invention is not necessarily incorporated into dispersion in advance, and may be incorporated into dispersion when preparing an ink liquid.

As a water-soluble organic solvent used in the present invention, preferred are those having a boiling point of 180° C. or higher. When a water-soluble organic solvent is contained in a inkjet recording ink, water-retentivity and wettability of the ink can be ensured. As a result, even after the inkjet recording ink is stored for a long period of time, neither aggregation of coloring material nor increase of viscosity occurs, thus storage stability being provided. In addition, even when a nozzle tip or the like of the inkjet printing apparatus is left open, the inkjet recording ink can maintain fluidity of dry matters for a long period of time. With use of the inkjet recording ink, high ejection stability can be obtained without causing nozzle clogging during printing when printing is restarted after a break of printing.

A water-soluble organic solvent usable in the present invention is illustrated in the following examples, but is not limited to these examples.

Examples include polyols such as ethylene glycol, diethylene glycol, 1,3-butylglocol, 3-methyl-1,3-butyl glycol, triethylene glycol, polyethylene glycol, polypropylene glycol, 1,5-pentanediol, 1,6-hexanediol, glycerine, 1,2,6-hexanetriol, 2-ethyl-1,3-hexanediol, ethyl-1,2,4-butanetriol, 1,2,3-butanetriol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl imidazolidinone, ϵ-caprolactam, and γ-butyrolactone; amides such as formaldehyde, N-methylformaldehyde, and N,N-dimethylformamide; amines such as monoethanolamine, diethanolamine, triethanolamine, monoethylamine, diethylamine, and triethylamine; sulfur-containing compounds such as dimethylsulfoxide, sulfolane, and thiodiethanol; propylene carbonate, and ethylene carbonate. These water-soluble organic solvents may be used solely or in combination of two or more.

Of these water-soluble organic solvents, at least one of 1,3-butyl glycol, diethylene glycol, triethylene glycol and glycerine is preferred to be contained. Using these water-soluble solvents provides excellent effects such as prevention of nozzle clogging due to the ink drying, i.e., prevention of ink jetting defects due to water evaporation, and improvements in color saturation of formed images.

Also, it is preferred to incorporate 2-ethyl-1,3-hexanediol (EHD) because the incorporation increases permeability of an ink and makes the pigment stay on the surface of a formed image to thereby prevent image bleeding, enabling to obtain a printed image having a high image density and causing little bleed-through. The amount of EHD is preferably 0.1% by mass to 10.0% by mass, more preferably, 0.5% by mass to 5.0% by mass. When the amount of EHD is lower than 0.1% by mass, little effect can be achieved. When the amount is higher than 10.0% by mass, reliability is lowered because of low solubility of its own.

In addition to water, various additives can be added to the pigment dispersion liquid in the present invention. Examples thereof include, as a water-soluble organic solvent, alcohols such as methanol, ethanol, 1-propanol, and 2-propanol; polyols such as ethylene glycol, diethylene glycol, triethylene glycol, propylene glycol, and glycerine; pyrrolidone derivatives such as N-pyrrolidone, and 2-pyrrolidone; ketones such as acetone and methyl ethyl ketone; and alkanolamine such as monoethanol amine, diethanol amine, and triethanol amine.

Additionally, nonionic, anionic, cationic and amphoteric surfactants, and antiseptics may be incorporated.

The carbon black dispersion in the present invention can be prepared by dispersing the carbon black, a dispersant, water, and if necessary, various additives, using a conventionally known dispersing device such as sand mill, ball mill, roll mill, bead mill, nanomizer, ultrahigh-speed rotation homogenizer, and ultrasonic homogenizer.

It is preferred to use a dispersant at a mixing ratio of 0.1:1 to 2:1 on a mass basis, and to adopt a wet dispersion process. The wet dispersion process as referred to in the present invention is a process in which a mixture of a pigment, a dispersant, water, and if necessary, water-soluble organic solvent is finely pulverized and dispersed by a wet dispersion process sand mill, ball mill, roll mill, bead mill, nanomizer, homogenizer, and the like.

The thus obtained pigment dispersion liquid in the present invention is preferably used, in particular, for a pigment-based inkjet ink. A pigment-based inkjet ink can be obtained by any known method, for example, by a method including mixing under stirring a pigment dispersion liquid in the present invention, water, a water-soluble organic solvent, and a surfactant, then filtering out coarse particles using a filter, a centrifuge, and the like, and then deaerating the filtrate, if needed. Preferably, the concentration of the carbon black in the ink is 1% by mass to 20% by mass based on the total mass of the ink. When the concentration is less than 1% by mass, the image density is too low to provide high definition printing. When the concentration is more than 20% by mass, viscosity of the ink tends to be high, and nozzle clogging is likely to occur.

Any materials similar to those described-above as the additives for the pigment dispersion liquid may be added to the ink. For example, a water-soluble organic solvent may be incorporated in an amount of 0% by mass to 50% by mass, preferably 5% by mass to 40% by mass, more preferably 10% by mass to 35% by mass.

The thus obtained inkjet recording ink of the present invention is preferably placed in an ink cartridge. The inkjet recording ink is printed onto an image support by means of an inkjet printing apparatus having an ink ejection unit configured to eject an inkjet recording ink, thereby enabling an image to be formed.

Examples of the printing methods include continuous-ejection type printing and an on-demand type printing. On-demand type ones include piezo types, thermal types, and electrostatic types.

EXAMPLES

Hereinafter, the present invention will be described in more detail with reference to Examples and Comparative Examples, which should not be construed as limiting the present invention. The term "parts" in the Examples and Comparative Examples represents "parts by mass".

[Pigment Dispersion Liquid (A)]
(Formulation)

| | |
|---|---|
| Carbon black NIPEX160-IQ (gas black, produced by Degussa AG): | 200 parts |
| sodium naphthalenesulfonate formalin condensate (A-45-PN, produced by Takemoto Oil & Fat Co., Ltd.) (total amount of dimer, trimer and tetramer naphthalenesulfonates: 48% by mass): | 50 parts |
| distilled water: | 750 parts |

After premixing the above components, the mixture was subjected to a bead mill dispersion using a bead mill dispersing device (UAM-015, produced by Kotobuki Kogyou Co., Ltd.) with a 0.03 mm zirconia bead (packing density: 6.03× $10^{-6}$ g/m$^2$), at a circumferential velocity of 10 m/s, at a liquid temperature of 25° C., for 20 minutes, and thereafter the resultant mixture was centrifuged using a centrifuge (MODEL-3600, produced by Kubota Corporation) to remove coarse particles, whereby pigment dispersion liquid (A) shown in Table (1) to Table (4) was yielded. The carbon black dispersion liquid had an average particle diameter of 124.5 nm and a standard deviation of 20.5 nm.

[Pigment Dispersion Liquid (B)]

A pigment dispersion liquid (B) shown in Table (1) to Table (4) was prepared in the same manner as that of pigment dispersion liquid (A), except that NIPEX150 (gas black; produced by Degussa AG) was used in place of the carbon black used in pigment dispersion liquid A.

[Pigment Dispersion Liquids (C) and (D)]

A pigment dispersion liquid (C) and a pigment dispersion liquid (D), both shown in Table (1) to Table (4), were prepared in the same manner as that of pigment dispersion liquid (A), except that the total amount of the dimer, trimer and tetramer naphthalenesulfonates used in pigment dispersion liquid (A) was changed to 26% by mass in pigment dispersion liquid (C), and to 75% by mass in pigment dispersion liquid (D).

[Pigment Dispersion Liquid (E)]

A pigment dispersion liquid (E) shown in Table (1) to Table (4) was prepared in the same manner as that of pigment dispersion liquid (A), except that a compound represented by the following General Formula (1) (n=40) was used in place of the sodium naphthalenesulfonate formalin condensate (A-45-PN; produced by Takemoto Oil & Fat Co., Ltd.).

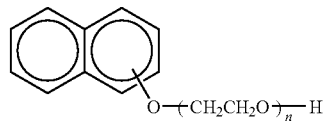

General Formula (1)

[Pigment Dispersion Liquids (F) and (G)]

A pigment dispersion liquid (F) and a pigment dispersion liquid (G), both shown in Table (1) to Table (4), were prepared in the same manner as that of pigment dispersion liquid (A), except that the carbon black used in pigment dispersion liquid (A) was changed to PRINTEX95 in pigment dispersion liquid (F) and to FW285 (furnace black, produced by Degussa AG) in pigment dispersion liquid (G).

Ink liquids were prepared using the pigment dispersion liquids (A) to (G) obtained in the above-mentioned processes. Each ink liquid was stirred for 30 minutes, and then filtered with a membrane filter having a pore diameter of 0.8 μm, and the filtrate was subjected to vacuum deaeration, whereby each of ink liquids (a) to (Z''') and (1) to (11) to be used in Examples and Comparative Examples was prepared.

Example 1

Ink Liquid (a)

| | |
|---|---|
| pigment dispersion liquid (A) (pigment concentration: 20%): | 50.0 parts |
| glycerine: | 3.0 parts |
| diethylene glycol: | 15.0 parts |
| 2-ethyl-1,3-hexanediol: | 3.0 parts |
| 2-pyrrolidone: | 3.0 parts |
| W5661 (anionic self-emulsifying ether polyurethane) (acid value: 48, mass-average molecular weight: 20,000, average primary particle diameter: 11.0 nm): | 2.0 parts |
| sodium polyoxyethylene (3) alkyl (C13) ether acetate: | 0.45 parts |
| distilled water: | 23.55 parts |

Example 2

Ink Liquid (b)

An ink liquid (b) of Example 2 was prepared in the same manner as in Example 1, except that the acid value and the average primary particle diameter of W5661 were changed to 66 and 8.2 nm, respectively.

Example 3

Ink Liquid (c)

An ink liquid (c) of Example 3 was prepared in the same manner as in Example 1, except that the acid value, the mass-average molecular weight, and the average primary particle diameter of W5661 were changed to 66, 16,000, and 10.4 nm, respectively.

Example 4

Ink Liquid (d)

An ink liquid (d) of Example 4 was prepared in the same manner as in Example 1, except that the acid value, the mass-average molecular weight, and the average primary particle diameter of W5661 were changed to 80, 16,000, and 10.3 nm, respectively.

Example 5

Ink Liquid (e)

An ink liquid (e) of Example 5 was prepared in the same manner as in Example 1, except that the acid value, the mass-average molecular weight, and the average primary particle diameter of W5661 were changed to 66, 10,900, and 10.3 nm, respectively.

Example 6

Ink Liquid (f)

An ink liquid (f) of Example 6 was prepared in the same manner as in Example 1, except that the acid value, the mass-average molecular weight, and the average primary particle diameter of W5661 were changed to 66, 31,000, and 9.8 nm, respectively.

Example 7

Ink Liquid (g)

An ink liquid (g) of Example 7 was prepared in the same manner as in Example 1, except that the acid value and the average primary particle diameter of W5661 were changed to 110 and 8.3 nm, respectively.

Example 8

Ink Liquid (h)

An ink liquid (h) of Example 8 was prepared in the same manner as in Example 1, except that the acid value and the average primary particle diameter of W5661 were changed to 30 and 12.3 nm, respectively.

Example 9

Ink Liquid (i)

An ink liquid (i) of Example 9 was prepared in the same manner as in Example 1, except that pigment dispersion liquid (A) was changed to pigment dispersion liquid (B), and the acid value, the mass-average molecular weight, and the average primary particle diameter of W5661 were changed to 80, 16,000, and 10.2 nm, respectively.

Example 10

Ink Liquid (j)

An ink liquid (j) of Example 10 was prepared in the same manner as in Example 1, except that pigment dispersion liquid (A) was changed to pigment dispersion liquid (C), and the acid value, the mass-average molecular weight, and the average primary particle diameter of W5661 were changed to 80, 16,000, and 10.4 nm, respectively.

Example 11

Ink Liquid (k)

An ink liquid (k) of Example 11 was prepared in the same manner as in Example 1, except that pigment dispersion liquid (A) was changed to pigment dispersion liquid (D), and the acid value, the mass-average molecular weight, and the average primary particle diameter of W5661 were changed to 80, 16,000, and 10.3 nm, respectively.

Example 12

Pigment Dispersion Liquid (A3)

A pigment dispersion liquid (A3) was prepared in the same manner as that of pigment dispersion liquid (A), except that FW18 (Channel black; produced by Degussa AG) was used in place of the carbon black used in pigment dispersion liquid (A).

An ink liquid (L) of Example 12 was prepared in the same manner as in Example 1, except that pigment dispersion liquid (A) was changed to pigment dispersion liquid (A3).

Example 13

Pigment Dispersion Liquid (A2)

A pigment dispersion liquid (A2) was prepared in the same manner as that of pigment dispersion liquid (A), except that the total amount of the dimer, trimer and tetramer of naphthalenesulfonates was changed to 15% by mass.

An ink liquid (m) of Example 13 was prepared in the same manner as in Example 1, except that pigment dispersion liquid (A) was changed to pigment dispersion liquid (A2).

Example 14

Pigment Dispersion Liquid (G)

A pigment dispersion liquid (A4) was prepared in the same manner as that of pigment dispersion liquid (A), except that the total amount of the dimer, trimer and tetramer naphthalenesulfonates was changed to 84% by mass An ink liquid (n) of Example 14 was prepared in the same manner as in Example 1, except that pigment dispersion liquid (A) was changed to pigment dispersion liquid (A4).

Example 15

Pigment Dispersion Liquid (H)

A pigment dispersion liquid (H) was prepared in the same manner as that of pigment dispersion liquid (A), except that the carbon black was changed to a carbon black whose BET specific surface area was 90 m$^2$/g (PRINTEX140U, Channel black, produced by Degussa AG).

An ink liquid (o) of Example 15 was prepared in the same manner as in Example 1, except that pigment dispersion liquid (A) was changed to pigment dispersion liquid (H).

Example 16

Pigment Dispersion Liquid (I)

A pigment dispersion liquid (I) was prepared in the same manner as that of pigment dispersion liquid (A), except that the carbon black was changed to a carbon black whose BET specific surface area was 460 m$^2$/g (FW2, Channel black, produced by Degussa AG).

An ink liquid (p) of Example 16 was prepared in the same manner as in Example 1, except that pigment dispersion liquid (A) was changed to pigment dispersion liquid (I).

Example 17

Pigment Dispersion Liquid (J)

A pigment dispersion liquid (J) was prepared in the same manner as that of pigment dispersion liquid (A), except that the carbon black was changed to a carbon black in which the average particle diameter of the primary particle was 9 nm (FW285, gas black, produced by Degussa AG).

An ink liquid (q) of Example 17 was prepared in the same manner as in Example 1, except that pigment dispersion liquid (A) was changed to pigment dispersion liquid (J).

Example 18

Pigment Dispersion Liquid (K)

A pigment dispersion liquid (K) was prepared in the same manner as that of pigment dispersion liquid (A), except that the carbon black was changed to a carbon black having an average primary particle diameter of 31 nm (PRINTEX150T, channel black, produced by Degussa AG).

An ink liquid (r) of Example 18 was prepared in the same manner as in Example 1, except that pigment dispersion liquid (A) was changed to pigment dispersion liquid (K).

Example 19

Pigment Dispersion Liquid (L)

A pigment dispersion liquid (L) was prepared in the same manner as that of pigment dispersion liquid (A2), except that the dispersion time was changed to 40 minutes.

An ink liquid (s) of Example 19 was prepared in the same manner as in Example 1, except that pigment dispersion liquid (A) was changed to pigment dispersion liquid (L).

Example 20

Pigment Dispersion Liquid (M)

A pigment dispersion liquid (M) was prepared in the same manner as that of pigment dispersion liquid (B), except that the dispersion time was changed to 10 minutes.

An ink liquid (t) of Example 20 was prepared in the same manner as in Example 1, except that pigment dispersion liquid (A) was changed to pigment dispersion liquid (M).

Example 21

Pigment Dispersion Liquid (N)

A pigment dispersion liquid (N) was prepared in the same manner as that of pigment dispersion liquid (A), except that the bead mill dispersion device was changed to an ultrasonic homogenizer US-300T (produced by Nihonseiki Kaisha Ltd.), and the dispersion time was changed to 15 minutes.

An ink liquid (u) of Example 21 was prepared in the same manner as in Example 1, except that pigment dispersion liquid (A) was changed to pigment dispersion liquid (N).

Example 22

Pigment Dispersion Liquid (O)

A pigment dispersion liquid (O) was prepared in the same manner as that of pigment dispersion liquid (A), except that the amount of sodium naphthalenesulfonate formalin condensate was changed to 10 parts, and the amount of distilled water was changed to 790 parts (the mixing ratio of the dispersant to the pigment was 0.05:1).

An ink liquid (v) of Example 22 was prepared in the same manner as in Example 1, except that pigment dispersion liquid (A) was changed to pigment dispersion liquid (O).

Example 23

Pigment Dispersion Liquid (P)

A pigment dispersion liquid (P) of Example 23 was prepared in the same manner as that of pigment dispersion liquid (A), except that the amount of sodium naphthalenesulfonate formalin condensate was changed to 500 parts, and the amount of distilled water was changed to 50 parts (the mixing ratio of the dispersant to the pigment was 2.2:1).

An ink liquid (w) of Example 23 was prepared in the same manner as in Example 1, except that pigment dispersion liquid (A) was changed to pigment dispersion liquid (P).

Example 24

Ink Liquid (x)

An ink liquid (x) of Example 24 (amount of the carbon black was 4% by mass) was prepared in the same manner as in Example 1, except that the amount of pigment dispersion liquid (A) was changed to 20 parts, and the amount of distilled water was changed to 58.55 parts.

Example 25

Pigment Dispersion Liquid (Q)

A pigment dispersion liquid (Q) was prepared in the same manner as that of pigment dispersion liquid (A), except that the amount of the carbon black was changed to 500 parts, and the amount of distilled water was changed to 450 parts.
(Ink Liquid (y)

An ink liquid (y) of Example 25 (amount of the carbon black was 52% by mass) was prepared in the same manner as in Example 1, except that pigment dispersion liquid (A) (50.0 parts by mass) was changed to pigment dispersion liquid (Q) (104 parts), and distilled water was not used.

Example 26

Ink Liquid (z)

An ink liquid (z) of Example 26 was prepared in the same manner as in Example 1, except that the acid value of W5661 was changed to 40.

Example 27

Ink Liquid (z')

An ink liquid (z') of Example 27 was prepared in the same manner as in Example 1, except that the acid value of W5661 was changed to 120.

Example 28

Ink Liquid (z")

An ink liquid (z") of Example 28 was prepared in the same manner as in Example 1, except that the mass-average molecular weight of W5661 was changed to 500.

Example 29

Ink Liquid (z''')

An ink liquid (z''') of Example 29 was prepared in the same manner as in Example 1, except that the mass-average molecular weight of W5661 was changed to 50,000.

Comparative Example 1

Ink Liquid (1)

An ink liquid (1) of Comparative Example 1 was prepared in the same manner as in Example 1, except that the acid value, the mass-average molecular weight, and the average primary particle diameter were respectively changed to 30, 6,000, and 26 nm.

Comparative Example 2

Ink Liquid (2)

An ink liquid (2) of Comparative Example 2 was prepared in the same manner as in Example 1, except that the acid value, the mass-average molecular weight, and the average primary particle diameter were respectively changed to 124, 1,000, and 21 nm.

Comparative Example 3

Ink Liquid (3)

An ink liquid (3) of Comparative Example 3 was prepared in the same manner as in Example 1, except that pigment dispersion liquid (A) was changed to pigment dispersion liquid (E) shown below, and W5661 was changed to SF650 (anionic self-emulsifying ester-based polyurethane resin particle) (produced by Dai-ichi Kogyo Seiyaku Co., Ltd.).

Comparative Example 4

Ink Liquid (4)

An ink liquid (4) of Comparative Example 4 was prepared in the same manner as in Example 1, except that pigment dispersion liquid (A) was changed to pigment dispersion liquid (G), and W5661 was changed to anionic self-emulsifying ester-based polyurethane resin particle) (produced by Mitsui Chemicals Polyurethanes, Inc.).

Comparative Example 5

Ink Liquid (5)

An ink liquid (5) of Comparative Example 5 was prepared in the same manner as in Example 1, except that the mass-average molecular weight of W5661 was changed to 450.

Comparative Example 6

Ink Liquid (6)

An ink liquid (6) of Comparative Example 6 was prepared in the same manner as in Example 1, except that W5661 was changed to SF150 (produced by Dai-ichi Kogyo Seiyaku Co., Ltd.; an ester polyurethane resin particle; average particle diameter: 87 nm).

Comparative Example 7

Ink Liquid (7)

An ink liquid (7) of Comparative Example 7 was prepared in the same manner as in Example 1, except that pigment dispersion liquid (A) was changed to pigment dispersion liquid (F) (PRINTEX95, furnace black, produced by Degussa AG).

Comparative Example 8

Ink Liquid (8)

An ink liquid (8) of Comparative Example 8 was prepared in the same manner as in Example 1, except that the acid value of W5661 was changed to 30.

Comparative Example 9

Ink Liquid (9)

An ink liquid (9) of Comparative Example 9 was prepared in the same manner as in Example 1, except that the acid value of W5661 was changed to 124.

Comparative Example 10

Ink Liquid (10)

An ink liquid (10) of Comparative Example 10 was prepared in the same manner as in Example 1, except that the mass-average molecular weight of W5661 was changed to 55,000.

Comparative Example 11

Ink Liquid (11)

An ink liquid (11) of Comparative Example 11 was prepared in the same manner as in Example 1, except that the average primary particle diameter of W5661 was changed to 23 nm.

Next, the average particle diameters of the pigments contained in the ink liquids (a) to (z''') and (1) to (11) were measured using the particle analyzer UPA150 produced by Nikkiso Co., Ltd.

Thereafter, an image was printed on a PPC paper 4024 (produced by Xerox Corporation) with an inkjet printing apparatus MJ-930C (produced by Seiko Epson Corporation. Then, image densities of the printed images were measured by X-Rite densitometer. The storage stability of the ink liquids was evaluated through the following test method:

[*1 an HPLC Analysis of Naphthalenesulfonic Acid Condensate]

device: LC-10VP (produced by Shimadzu Corporation)
column: ZORBAX BP-ODS (4.6 id.×150 mm) GL SCIENCE
guard column: ZORBAX BP-ODS (4.0 id.×10 mm) GL SCIENCE
detector: UV (237 nm)
mobile phase: $CH_3CN$/0.005 M, PIC aqueous solution=25/75
flow rate: 1 mL/min
sample preparation: 200 ppm solution
injection volume: 20 μL

[*2 Measurement of Image Density]

For the image density, the colorimetry of the solid image in the image samples was carried out using X-Rite densitometer.

[*3 Ejection Stability]

For the ejection stability, after printed paper sheets were prepared by a printing apparatus, the printing apparatus was left intact in a state where the printing apparatus head was capped under the condition of a temperature of 40° C. for 1 month. One month later, the ejection stability was evaluated by checking whether or not the ink-ejected condition of the printing apparatus could be recovered to the initial ink-ejection level based on the evaluation criteria of the number of cleaning operations stated below.

A: Could be printed without cleaning.
B: Could be recovered to the initial ink-ejection level with one cleaning time.
C: Could be recovered to the initial ink-ejection level with two or three cleaning times.
D: Could not be recovered to the initial ink-ejection level even with three or more cleaning times.

[*4 Storage Stability of Ink Liquid]

Each of the inkjet inks was placed and sealed in a polyethylene container and then stored in an environment of 70° C. for 3 weeks. Thereafter, the particle diameter, surface tension, and viscosity of the inkjet inks were respectively measured to obtain the rate of change in the physical properties from the initial physical properties. The inkjet inks were evaluated from the change rate based on the following evaluation criteria.

A: The change rate in physical properties was less than 5% in all evaluation items of particle diameter, surface tension, and viscosity.
B: The change rate in physical properties was less than 5% to 10% in all evaluation items of particle diameter, surface tension, and viscosity.
C: The change rate in physical properties was less than 30% in all evaluation items of particle diameter, surface tension, and viscosity.
D: The change rate in physical properties was more than 50% in evaluation items of particle diameter and viscosity.

[*5 Abrasion Resistance]

The printed image was rubbed 10 times with a commercially available sand eraser under application of load of 750 g. The peeling level of the image after rubbing was observed in comparison with the image before rubbing. The abrasion resistance was evaluated based on the following evaluation criteria.

A: No peeling was observed.
B: Partial peeling was observed and visibility was also lowered.
C: Almost whole part peeled off.

TABLE 1 (1)

| Dispersion liquid/Ink | Specific surface area of carbon black (BET-$m^2$/g) | Primary particle diameter of carbon black (nm) | Acid value of resin | Mass-average molecular weight | Average particle diameter of dispersion liquid (D50) (nm) | Standard deviation of particle diameter of dispersion liquid |
|---|---|---|---|---|---|---|
| Ex. 1 (A)/(a) | 150 | 20 | 48 | 20,000 | 124.5 | 50.5 |
| Ex. 2 (A)/(b) | 150 | 20 | 66 | 20,000 | 118.3 | 49.2 |
| Ex. 3 (A)/(c) | 150 | 20 | 66 | 16,000 | 130.5 | 51.2 |
| Ex. 4 (A)/(d) | 150 | 20 | 80 | 16,000 | 122.1 | 52.1 |
| Ex. 5 (A)/(e) | 150 | 20 | 66 | 10,900 | 120.2 | 49.3 |
| Ex. 6 (A)/(f) | 150 | 20 | 66 | 31,000 | 128.3 | 54.3 |
| Ex. 7 (A)/(g) | 150 | 20 | 110 | 20,000 | 122.5 | 51.6 |
| Ex. 8 (A)/h) | 150 | 20 | 42 | 20,000 | 121.2 | 50.8 |
| Ex. 9 (B)/(i) | 110 | 25 | 80 | 16,000 | 123.1 | 51.9 |
| Ex. 10 (C)/(j) | 150 | 20 | 80 | 16,000 | 125.6 | 54.3 |
| Ex. 11 (D)/(k) | 150 | 20 | 48 | 16,000 | 122.4 | 50.4 |
| Ex. 12 (A3)/(l) | 260 | 15 | 48 | 16,000 | 117.8 | 50.3 |
| Ex. 13 (A2)/(m) | 150 | 20 | 48 | 20,000 | 123.2 | 51.3 |
| Ex. 14 (A4)/(n) | 150 | 20 | 48 | 20,000 | 121.1 | 52.3 |
| Ex. 15 (H)/(o) | 90 | 29 | 48 | 20,000 | 138.2 | 63.5 |

TABLE 1 (1)-continued

| Dispersion liquid/Ink | Specific surface area of carbon black (BET-m²/g) | Primary particle diameter of carbon black (nm) | Acid value of resin | Mass-average molecular weight | Average particle diameter of dispersion liquid (D50) (nm) | Standard deviation of particle diameter of dispersion liquid |
|---|---|---|---|---|---|---|
| Ex. 16 (I)/(p) | 460 | 13 | 48 | 20,000 | 125.6 | 62.3 |
| Ex. 17 (J)/(q) | 350 | 9 | 48 | 20,000 | 119.2 | 54.2 |
| Ex. 18 (K)/(r) | 110 | 31 | 48 | 20,000 | 143.2 | 68.3 |
| Ex. 19 (L)/(s) | 260 | 15 | 48 | 20,000 | 62.3 | 28.3 |
| Ex. 20 (M)/(t) | 110 | 25 | 48 | 20,000 | 192.3 | 95.3 |

TABLE 1 (2)

| Dispersion liquid/Ink | Average particle diameter of ink liquid | Standard deviation of particle diameter of ink liquid | Image density | Ejection stability | Storage stability | Abrasion resistance |
|---|---|---|---|---|---|---|
| Ex. 1 (A)/(a) | 126.3 | 51.2 | 1.67 | A | A | A |
| Ex. 2 (A)/(b) | 119.2 | 48.3 | 1.68 | A | A | A |
| Ex. 3 (A)/(c) | 132.1 | 52.9 | 1.59 | A | A | A |
| Ex. 4 (A)/(d) | 121.3 | 51.1 | 1.61 | A | A | A |
| Ex. 5 (A)/(e) | 115.3 | 45.3 | 1.64 | A | A | A |
| Ex. 6 (A)/(f) | 127.2 | 50.3 | 1.65 | A | A | A |
| Ex. 7 (A)/(g) | 120.6 | 50.3 | 1.63 | A | A | A |
| Ex. 8 (A)/h | 119.6 | 51.2 | 1.60 | A | A | A |
| Ex. 9 (B)/(i) | 123.2 | 50.9 | 1.59 | A | A | A |
| Ex. 10 (C)/(j) | 125.2 | 54.3 | 1.58 | A | A | A |
| Ex. 11 (D)/(k) | 122.6 | 50.8 | 1.64 | A | A | A |
| Ex. 12 (A3)/(l) | 117.3 | 50.4 | 1.62 | A | A | A |
| Ex. 13 (A2)/(m) | 122.3 | 50.3 | 1.61 | B | B | A |
| Ex. 14 (A4)/(n) | 123.4 | 51.2 | 1.62 | B | B | A |
| Ex. 15 (H)/(o) | 137.9 | 62.3 | 1.59 | B | B | A |
| Ex. 16 (I)/(p) | 125.4 | 61.3 | 1.57 | B | B | A |
| Ex. 17 (J)/(q) | 117.3 | 53.2 | 1.55 | B | B | A |
| Ex. 18 (K)/(r) | 144.3 | 69.2 | 1.59 | B | B | A |
| Ex. 19 (L)/(s) | 65.3 | 25.3 | 1.05 | B | B | A |
| Ex. 20 (M)/(t) | 198.3 | 94.2 | 1.58 | C | B | A |

TABLE 1 (3)

| Dispersion liquid/Ink | Specific surface are of carbon black (BET-m²/g) | Primary particle diameter of carbon black (nm) | Acid value of resin | Mass-average molecular weight | Average particle diameter of dispersion liquid (D50) (nm) | Standard deviation of particle diameter of dispersion liquid |
|---|---|---|---|---|---|---|
| Ex. 21 (N)/(u) | 150 | 20 | 48 | 20,000 | 132.2 | 81.2 |
| Ex. 22 (O)/(v) | 150 | 20 | 48 | 20,000 | 124.3 | 52.3 |
| Ex. 23 (P)/(w) | 150 | 20 | 48 | 20,000 | 121.3 | 54.2 |
| Ex. 24 (A)/(x) | 150 | 20 | 48 | 20,000 | 124.3 | 50.4 |
| Ex. 25 (Q)/(y) | 150 | 20 | 48 | 20,000 | 125.1 | 50.8 |
| Ex. 26 (A)/(z) | 150 | 20 | 40 | 20,000 | 124.5 | 50.5 |
| Ex. 27 (A)/(z') | 150 | 20 | 120 | 20,000 | 124.5 | 50.5 |
| Ex. 28 (A)/(z") | 150 | 20 | 48 | 500 | 124.5 | 50.5 |
| Ex. 29 (A)/(z''') | 110 | 20 | 48 | 50,000 | 124.5 | 50.5 |
| Comp. Ex. 1 (A)/(1) | 150 | 20 | 30 | 20,000 | 124.6 | 50.4 |
| Comp. Ex. 2 (A)/(2) | 150 | 20 | 124 | 20,000 | 125.2 | 51.2 |
| Comp. Ex. 3 (E)/(2) | 250 | 15 | — | — | 124.5 | 55.6 |
| Comp. Ex. 4 (G)/(4) | 350 | 11 | — | — | 134.3 | 62.3 |
| Comp. Ex. 5 (A)/(5) | 150 | 20 | 48 | 450 | 124.8 | 51.3 |
| Comp. Ex. 6 (A)/(6) | 150 | 20 | — | — | 124.5 | 50.5 |
| Comp. Ex. 7 (F)/(7) | 250 | 15 | 48 | 20,000 | 125.6 | 55.6 |
| Comp. Ex. 8 (A)/(8) | 150 | 20 | 30 | 20,000 | 124.5 | 50.5 |
| Comp. Ex. 9 (A)/(9) | 150 | 20 | 124 | 20,000 | 124.5 | 50.5 |
| Comp. Ex. 10 (A)/(10) | 150 | 20 | 48 | 55,000 | 124.5 | 50.5 |
| Comp. Ex. 11 (A)/(11) | 150 | 20 | 48 | 20,000 | 124.5 | 50.5 |

TABLE 1 (4)

| Dispersion liquid/Ink | Average particle diameter of ink liquid | Standard deviation of particle diameter of ink liquid | Image density | Ejection stability | Storage stability | Abrasion resistance |
|---|---|---|---|---|---|---|
| Ex. 21 (N)/(u) | 133.5 | 83.2 | 1.55 | C | C | A |
| Ex. 22 (O)/(v) | 125.6 | 53.1 | 1.59 | B | C | A |
| Ex. 23 (P)/(w) | 122.5 | 53.2 | 1.61 | B | C | A |
| Ex. 24 (A)/(x) | 123.4 | 51.8 | 1.51 | A | A | A |
| Ex. 25 (Q)/(y) | 125.8 | 50.7 | 1.75 | C | C | A |
| Ex. 26 (A)/(z) | 127.3 | 51.8 | 1.62 | A | B | A |
| Ex. 27 (A)/(z') | 128.4 | 53.2 | 1.60 | B | B | A |
| Ex. 28 (A)/(z'') | 132.2 | 52.1 | 1.58 | C | C | B |
| Ex. 29 (A)/(z''') | 130.5 | 58.2 | 1.55 | C | C | B |
| Comp. Ex. 1 (A)/(1) | 126.5 | 50.2 | 1.45 | C | C | B |
| Comp. Ex. 2 (A)/(2) | 127.3 | 51.4 | 1.39 | C | C | B |
| Comp. Ex. 3 (E)/(2) | 126.8 | 56.8 | 1.22 | D | D | C |
| Comp. Ex. 4 (G)/(4) | 133.5 | 61.2 | 1.15 | D | D | C |
| Comp. Ex. 5 (A)/(5) | 123.4 | 50.3 | 1.59 | D | D | C |
| Comp. Ex. 6 (A)/(6) | 128.9 | 53.2 | 1.23 | D | D | C |
| Comp. Ex. 7 (F)/(7) | 123.5 | 51.3 | 1.21 | C | D | C |
| Comp. Ex. 8 (A)/(8) | 128.6 | 52.2 | 1.61 | C | D | C |
| Comp. Ex. 9 (A)/(9) | 128.9 | 59.8 | 1.40 | C | D | C |
| Comp. Ex. 10 (A)/(10) | 131.2 | 59.6 | 1.53 | D | D | C |
| Comp. Ex. 11 (A)/(11) | 135.2 | 61.2 | 1.52 | D | D | C |

The invention claimed is:

1. An inkjet recording ink comprising:
a carbon black,
a dispersant comprising a sodium naphthalenesulfonate formalin condensate, wherein the sodium naphthalenesulfonate formalin condensate comprises dimer, trimer and tetramer naphthalenesulfonates in a total amount of (dimer+trimer+tetramer naphthalene sulfonates) of from 20% by mass to 80% by mass based on total amount of sodium naphthalenesulfonate formalin condensate,
a polyurethane resin particle, and
water,
wherein the carbon black is a channel black, a gas black, or a mixture of a channel black and a gas black, and the polyurethane resin particle is an anionic self-emulsifying ether-based polyurethane resin particle, wherein the anionic self-emulsifying ether-based polyurethane resin particle has an acid value of from 40 to 120 and a mass-average molecular weight of from 500 to 50,000, and an average primary particle diameter of 20 nm or less.

2. The inkjet recording ink according to claim 1, wherein the carbon black has a BET specific surface area of from 100 $m^2/g$ to 400 $m^2/g$, and average primary particle diameter of from 10 nm to 30 nm.

3. The inkjet recording ink according to claim 1, wherein an average particle diameter (D50) of the carbon black measured by dynamic light scattering method is 70 nm to 180 nm, and a standard deviation in particle size distribution of the carbon black is equal to or lower than one-half of the average particle diameter.

4. The inkjet recording ink according to claim 1, wherein a mixing ratio of the dispersant to the carbon black is 0.1 to 2 on a mass basis.

5. The inkjet recording ink according to claim 1, wherein the amount of the carbon black is from 5% by mass to 50% by mass.

6. The inkjet recording ink according to claim 1, wherein an emulsion of the ether-based polyurethane resin has a glass transition temperature of from −50° C. to 150° C.

7. The inkjet recording ink according to claim 1, wherein the minimum film forming temperature of an emulsion of the ether-based polyurethane resin is 25° C. or lower.

8. The inkjet recording ink according to claim 1, wherein the amount of an emulsion of the ether-based polyurethane resin is from 0.1% by mass to 20% by mass.

9. The inkjet recording ink according to claim 1, wherein the amount of the carbon black is from 1% by mass to 20% by mass.

10. An inkjet printing apparatus having an ink ejection unit configured to eject an inkjet recording ink onto an image support,
wherein the inkjet recording ink comprises: a carbon black, a dispersant, a polyurethane resin particle, and water, wherein the sodium naphthalenesulfonate formalin condensate comprises dimer, trimer and tetramer naphthalenesulfonates in a total amount of (dimer+trimer+tetramer naphthalene sulfonates) of from 20% by mass to 80% by mass based on total amount of sodium naphthalenesulfonate formalin condensate, and
wherein the carbon black is a channel black, a gas black, or a mixture of a channel black and a gas black, and the polyurethane resin particle is an anionic self-emulsifying ether-based polyurethane resin particle, wherein the anionic self-emulsifying ether-based polyurethane resin particle has an acid value of from 40 to 120 and a mass-average molecular weight of from 500 to 50,000, and an average primary particle diameter of 20 nm or less.

11. The inkjet printing apparatus according to claim 10, wherein the ink ejection unit is of a piezo type.

12. The inkjet printing apparatus according to claim 10, wherein the ink ejection unit is of a thermal type.

13. An image forming method comprising:
printing an image through an inkjet recording process with an inkjet recording ink,
wherein the inkjet recording ink comprises: a carbon black, a dispersant, a polyurethane resin particle, and water, wherein the sodium naphthalenesulfonate formalin condensate comprises dimer, trimer and tetramer naphthalenesulfonates in a total amount of (dimer+trimer+tetramer naphthalene sulfonates) of from 20% by mass to 80% by mass based on total amount of sodium naphthalenesulfonate formalin condensate, and
wherein the carbon black is a channel black, a gas black, or a mixture of a channel black and a gas black, and the polyurethane resin particle is an anionic self-emulsifying ether-based polyurethane resin particle, wherein the anionic self-emulsifying ether-based polyurethane resin particle has an acid value of from 40 to 120 and a mass-average molecular weight of from 500 to 50,000, and an average primary particle diameter of 20 nm or less.

* * * * *